US009505631B2

(12) United States Patent
Masukuni et al.

(10) Patent No.: US 9,505,631 B2
(45) Date of Patent: Nov. 29, 2016

(54) POSITIVE ELECTRODE ACTIVE MATERIAL FOR SECONDARY BATTERIES WITH NONAQUEOUS ELECTROLYTIC SOLUTION, PROCESS FOR THE PRODUCTION OF THE ACTIVE MATERIAL, AND SECONDARY BATTERIES WITH NONAQUEOUS ELECTROLYTIC SOLUTION

(75) Inventors: Hiroaki Masukuni, Yamaguchi-ken (JP); Kazumichi Koga, Yamaguchi-ken (JP); Masayuki Uegami, Yamaguchi-ken (JP); Kazutoshi Matsumoto, Yamaguchi-ken (JP)

(73) Assignee: TODA KOGYO CORPORATION, Hiroshima (JP)

( * ) Notice: Subject to any disclaimer, the term of this patent is extended or adjusted under 35 U.S.C. 154(b) by 806 days.

(21) Appl. No.: 13/144,361

(22) PCT Filed: Jan. 19, 2010

(86) PCT No.: PCT/JP2010/050552
§ 371 (c)(1),
(2), (4) Date: Aug. 22, 2011

(87) PCT Pub. No.: WO2010/084855
PCT Pub. Date: Jul. 29, 2010

(65) Prior Publication Data
US 2011/0297876 A1    Dec. 8, 2011

(30) Foreign Application Priority Data

Jan. 20, 2009    (JP) .................................. 2009-010420

(51) Int. Cl.
*H01M 4/88*    (2006.01)
*C01G 45/12*    (2006.01)

(52) U.S. Cl.
CPC ....... *C01G 45/1242* (2013.01); *C01P 2002/32* (2013.01); *C01P 2002/52* (2013.01);
(Continued)

(58) Field of Classification Search
CPC .. H01M 4/485; H01M 4/505; H01M 4/5825; H01M 4/50; C01G 45/02; C01G 45/1221; C01G 45/1242; C01G 49/0072; C01B 25/45
USPC ........... 252/182.1, 518.1; 429/188, 223, 224, 429/231.1, 231.95, 218.1; 423/599
See application file for complete search history.

(56) References Cited

U.S. PATENT DOCUMENTS 5,084,366 A * 1/1992 Toyoguchi .................... 429/224
6,093,505 A * 7/2000 Miura ......................... 429/218.1
(Continued)

FOREIGN PATENT DOCUMENTS

EP    2 214 233 A1    8/2010
JP    2000-58055    2/2000
(Continued)

OTHER PUBLICATIONS

Ohzuku et al., Solid-state redox potentials for Li[Me1/2Mn3/2]O4 (Me: 3d transition metal) having spinel-framework structures: a serise of 5 volt materials for advanced lithium-ion batteries, Journal of Power Sources 81-82 (1999) 90-94.*
(Continued)

*Primary Examiner* — Khanh Tuan Nguyen
(74) *Attorney, Agent, or Firm* — Nixon & Vanderhye P.C.

(57) ABSTRACT

The present invention relates to positive electrode active substance particles for lithium ion batteries, comprising lithium manganate particles comprising Li and Mn as main components and having a cubic spinel structure (Fd-3m), wherein primary particles of the positive electrode active substance have a dodecahedral or higher-polyhedral shape in which none of crystal planes equivalent to the (111) plane are located adjacent to each other, and flat crystal planes are crossed with each other to form a clear ridge, and an average primary particle diameter of the primary particles is not less than 1 μm and not more than 20 μm. The positive electrode active substance particles according to the present invention are excellent in packing property, load characteristics and high-temperature stability.

7 Claims, 8 Drawing Sheets

(52) U.S. Cl.
CPC ........ *C01P2002/77* (2013.01); *C01P 2004/03* (2013.01); *C01P 2004/30* (2013.01); *C01P 2004/41* (2013.01); *C01P 2004/61* (2013.01); *C01P 2004/62* (2013.01); *C01P 2006/11* (2013.01); *C01P 2006/12* (2013.01); *C01P 2006/40* (2013.01); *Y02E 60/122* (2013.01); *Y02P 70/54* (2015.11)

(56) References Cited

U.S. PATENT DOCUMENTS

| | | | | |
|---|---|---|---|---|
| 6,248,477 | B1* | 6/2001 | Howard, Jr. | C01G 45/1242 423/593.1 |
| 6,267,943 | B1* | 7/2001 | Manev et al. | 423/599 |
| 6,548,208 | B1* | 4/2003 | Kasamatsu et al. | 429/218.1 |
| 6,627,351 | B1* | 9/2003 | Yamaura | 429/224 |
| 7,648,800 | B1* | 1/2010 | Kuyama et al. | 429/231.95 |
| 2002/0106566 | A1* | 8/2002 | Nemoto | H01M 4/131 429/224 |
| 2002/0122984 | A1* | 9/2002 | Sakai et al. | 429/231.1 |
| 2004/0229124 | A1 | 11/2004 | Miyamoto et al. | |
| 2010/0270496 | A1* | 10/2010 | Oki | H01M 4/48 252/182.1 |
| 2010/0288969 | A1 | 11/2010 | Koga et al. | |

FOREIGN PATENT DOCUMENTS

| | | | |
|---|---|---|---|
| JP | 2000-113889 | | 4/2000 |
| JP | 2000-215892 | | 8/2000 |
| JP | 2001-180938 | | 7/2001 |
| JP | 2001-206722 | | 7/2001 |
| JP | 2002-8654 | | 1/2002 |
| JP | 2002-008654 | | 1/2002 |
| JP | 2002-56846 | | 2/2002 |
| JP | 2002-145617 | | 5/2002 |
| JP | 2002-308628 | | 10/2002 |
| JP | 2004-186149 | | 7/2004 |
| JP | 2004-265749 | | 9/2004 |
| JP | 2005-029424 | * 2/2005 | ............ C01G 45/00 |
| JP | 2006-219323 | | 8/2006 |
| JP | 2008-251390 | | 10/2008 |

OTHER PUBLICATIONS

International Search Report for PCT/JP2010/050552, mailed Apr. 13, 2010.

Extended European Search Report in EP 10 73 3462 dated Mar. 27, 2014.

\* cited by examiner

POSITIVE ELECTRODE ACTIVE MATERIAL FOR SECONDARY BATTERIES WITH NONAQUEOUS ELECTROLYTIC SOLUTION, PROCESS FOR THE PRODUCTION OF THE ACTIVE MATERIAL, AND SECONDARY BATTERIES WITH NONAQUEOUS ELECTROLYTIC SOLUTION

This application is the U.S. national phase of International Application No. PCT/JP2010/050552, filed 19 Jan. 2010, which designated the U.S. and claims priority to Japan Application No. 2009-010420 filed 20 Jan. 2009, the entire contents of each of which are hereby incorporated by reference.

TECHNICAL FIELD

The present invention relates to a non-aqueous electrolyte secondary battery which comprises a positive electrode (cathode) active substance with a well-controlled particle configuration to realize improvement in packing property of the positive electrode active substance and high-temperature characteristics of the battery, and which has a long service life and is excellent in load characteristics.

BACKGROUND ART

With the recent rapid development of portable and cordless electronic devices such as audio-visual (AV) devices and personal computers, there is an increasing demand for secondary batteries having a small size, a light weight and a high energy density as a power source for driving these electronic devices. Under these circumstances, lithium ion secondary batteries having advantages such as a high charge/discharge voltage and a large charge/discharge capacity have been noticed.

Hitherto, as positive electrode (cathode) active substances useful for high energy-type lithium ion secondary batteries exhibiting a 4 V-grade voltage, there are generally known $LiMn_2O_4$ having a spinel structure, and $LiCoO_2$, $LiCO_{1-x}Ni_xO_2$ and $LiNiO_2$ having a layered rock-salt type structure, or the like. Among these active substances, $LiCoO_2$ is more excellent because of a high voltage and a high capacity thereof, but has problems such as a high production cost due to a less amount of a cobalt raw material supplied, and a poor environmental safety upon disposal of batteries obtained using the substance. In consequence, there have now been made earnest studies on lithium manganate having a spinel type structure (basic composition: $LiMn_2O_4$; this is hereinafter defined in the same way) which is produced by using, as a raw material, manganese having a large supply amount, a low cost and a good environmental compatibility. Further, although the layered rock-salt type structure has a two-dimensional diffusion path, the spinel structure has a three-dimensional Li diffusion path. Therefore, it is expected that the latter spinel structure is used as a positive electrode active substance in the applications requiring a large electric current, in particular, in the applications of a large secondary batteries for automobiles.

As is known in the art, the lithium manganate particles may be obtained by mixing a manganese compound and a lithium compound at a predetermined ratio and then calcining the resulting mixture in a temperature range of 700 to 1000° C.

However, when the lithium manganate is highly enhanced in crystallizability in order to obtain a crystal structure suitable for an enhanced performance of the battery, the resulting lithium manganate particles have an octahedral shape with a low packing rate as an automorphic shape of the cubic spinel structure as shown in FIG. 7. Therefore, when using the lithium manganate particles having such an octahedral structure as a positive electrode active substance for lithium ion secondary batteries, there tends to arise such a problem that the obtained battery is deteriorated in capacity. In addition, the battery tends to be deteriorated in charge/discharge cycle characteristics and storage characteristics under high-temperature conditions. The reason therefor is considered to be that when charge/discharge cycles are repeated, the crystal lattice is expanded and contracted owing to desorption and insertion behavior of lithium ions in the crystal structure to cause change in volume of the crystal, which results in occurrence of breakage of the crystal lattice, deteriorated current collecting property of the electrode or elution of manganese in an electrolyte solution.

At present, in the lithium ion secondary batteries using the lithium manganate particles, it has been strongly required that the positive electrode active substance is packed in an electrode with a high packing density, the electrode formed from the positive electrode active substance has a low electric resistance, and the resulting batteries are free from deterioration in charge/discharge capacity due to repeated charge/discharge cycles and improved in their characteristics, in particular, under high-temperature conditions.

In order to improve the charge/discharge cycle characteristics of the batteries under high-temperature conditions, it is necessary that the positive electrode active substance used therein which comprises the lithium manganate particles has an excellent packing property and an appropriate particle size, and further is free from elution of manganese therefrom. To meet these requirements, there have been proposed the method of suitably controlling a particle size and a particle size distribution of the lithium manganate particles; the method of obtaining the lithium manganate particles having a high crystallinity by controlling a calcination temperature thereof (Patent Document 1); the method of adding different kinds of elements to the lithium manganate particles to strengthen a bonding force between crystals thereof (Patent Documents 2 to 4); the method of subjecting the lithium manganate particles to surface treatment or adding additives thereto to suppress elution of manganese therefrom (Patent Documents 5 and 6); or the like.

Also, in Patent Document 7, there is described the method of reducing an electric resistance of a positive electrode active substance by improving a crystallizability of the lithium manganate particles and thereby obtaining particles having an octahedral shape or a generally octahedral shape.

Patent Document 1: Japanese Patent Application Laid-Open (KOAKI) No. 2001-206722

Patent Document 2: Japanese Patent Application Laid-Open (KOAKI) No. 2000-215892

Patent Document 3: Japanese Patent Application Laid-Open (KOAKI) No. 2002-145617

Patent Document 4: Japanese Patent Application Laid-Open (KOAKI) No. 2008-251390

Patent Document 5: Japanese Patent Application Laid-Open (KOAKI) No. 2000-58055

Patent Document 6: Japanese Patent Application Laid-Open (KOAKI) No. 2002-308628

Patent Document 7: Japanese Patent Application Laid-Open (KOAKI) No. 2000-113889

DISCLOSURE OF THE INVENTION

Problem to be Solved by the Invention

At present, it has been strongly required to provide lithium manganate as a positive electrode active substance for a non-aqueous electrolyte secondary battery which is improved in output characteristics and high-temperature characteristics. However, the materials capable of fully satisfying these requirements have not been obtained until now.

That is, even the techniques described in the above Patent Documents 1 to 6 may fail to enhance a packing property and fully improve load characteristics and high-temperature characteristics. In addition, the above Patent Documents neither teach nor suggest that the crystals are controlled in their shape to enhance these properties.

Also, in the above Patent Document 7, it is described that the lithium manganate particles are improved in crystallizability to obtain crystal particles having an octahedral shape or a generally octahedral shape as an automorphic shape of the cubic spinel structure which results in a reduced electric resistance of the positive electrode active substance and an enhanced capacity retention rate thereof. However, Patent Document 7 may fail to specify a packing property of the positive electrode active substance in lithium ion secondary batteries.

That is, the particles having an octahedral shape or a generally octahedral shape have a low packing property as compared to spherical particles having the same volume. In view of the packing property, it is considered to be more important that the particles are in the form of polyhedral particles constituted from a larger number of crystal planes, i.e., a higher-order polyhedron, in order to approach their shape to that of spherical particles.

In addition, respective planes of the octahedron of the cubic spinel crystals are constructed from the (111) plane and those crystal planes equivalent thereto.

On the other hand, a diffusion path of lithium ions in spinel manganese crystals extends in the [110] direction and in the directions equivalent thereto. The charging and discharging of the lithium ion batteries are performed by insertion and desorption of lithium ions in the positive electrode active substance. Therefore, it is considered to be advantageous that the crystal plane extending in the direction closer to that perpendicular to the [110] direction on which the diffusion path of lithium ions is located, is exposed onto a surface of the positive electrode active substance because the resistance against insertion and desorption of the lithium ions becomes reduced. Assuming that the angle between the [110] direction or the direction equivalent thereto and a specific crystal plane in the cubic spinel structure is θ, as is determined from the geometrical relationship therebetween, the angle θ on the [111] plane is about 54.7°, the angle θ on the [221] plane is about 74.2°, and the angle θ on the [110] plane is 90° (for example, refer to Cullity, "Elements of X-Ray Diffraction", translated by Gentaro matsumura, Agunne, 6th Edition, p. 466). Therefore, in view of facilitated insertion and desorption of the lithium ions, it is considered to be more advantageous that the crystal plane appearing on the surface of respective crystal particles of the positive electrode active substance is constituted of a less area of the {111} plane and a broader area of the {110} plane or the {221} plane.

In addition, it has been reported that one of the reasons for deterioration of the lithium ion batteries resides in elution of manganese ions from the manganese spinel particles into an electrolyte solution owing to the disproportionation reaction as shown below which may occur in a high-temperature electrolyte solution.

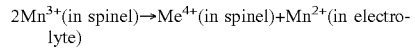

It is considered that the elution of manganese occurs from portions having a large curvature. Therefore, it is considered that the structure having a sharp ridge (edge) or a sharp apex such as an octahedral shape is more likely to suffer from the elution of Mn. In order to suppress the elution of Mn, it is considered to be important that a curvature of the ridge formed by crossing crystal planes which constitute primary particles, i.e., an angle between the adjacent crystal planes, is formed into a larger obtuse angle or into an apex having a less sharpness.

The reason why the cubic manganese spinel crystals are apt to have an octahedral shape as an automorphic shape thereof which is constituted from the (111) plane and the planes equivalent thereto, is considered to be that the surface energy of the (111) plane or the planes equivalent thereto is smaller than that of the other crystal planes such as, for example, (100) plane, (110) plane, (221) plane and planes equivalent thereto. For this reason, it is considered that the octahedral crystals constituted from the crystal planes equivalent to the (111) plane tend to be produced in order to minimize the surface energy of the crystals as a whole. Therefore, it has been considered that if the surface energy of the crystal planes other than the crystal planes equivalent to the (111) plane is reduced, namely, if growth of the other crystal planes is suppressed, it is possible to obtain crystals having these crystal planes.

Means for Solving the Problem

The above problems and technical tasks can be solved and accomplished by the following aspects of the present invention.

That is, according to the present invention, there are provided positive electrode active substance particles for lithium ion batteries, comprising lithium manganate particles comprising Li and Mn as main components and having a cubic spinel structure (space group: Fd-3m (No. 227)), primary particles of the positive electrode active substance having a dodecahedral or higher-polyhedral shape in which none of crystal planes equivalent to the (111) plane are located adjacent to each other, and flat crystal planes are crossed with each other to form a clear ridge, and an average primary particle diameter of the primary particles being not less than 1 μm and not more than 20 μm (Invention 1).

Also, according to the present invention, there are provided the positive electrode active substance particles for lithium ion batteries as described in the above Invention 1, wherein a ratio of Li to a sum of Mn and a substituting metal element [Li/(Mn+substituting metal element) in which the substituting metal element is at least one metal element other than Li and Mn with which an Mn (16d) site is substituted] in the positive electrode active substance is not less than 0.5 (Invention 2).

In addition, according to the present invention, there is provided a process for producing the positive electrode active substance particles as described in the above invention 1 or 2, comprising the steps of mixing a manganese compound, a lithium compound and a crystal plane growth inhibitor with each other; and calcining the resulting mixture at a temperature of 800 to 1050° C. (Invention 3).

Also, according to the present invention, there is provided the process for producing the positive electrode active substance particles as described in the above Invention 3, wherein the manganese compound is in the form of secondary particles obtained by aggregating primary particles of $Mn_3O_4$ (trimanganese tetraoxide) having a generally octahedral shape (which is defined by any of an octahedral shape close to a regular octahedral shape in which flat crystal planes are crossed with each other to form a clear ridge; a near-octahedral shape in which a portion at which four planes of an octahedron are crossed with each other forms not a complete apex but a plane or a ridge; a near-octahedral shape in which a portion at which two planes of an octahedron are crossed with each other forms not a complete ridge but a plane; and a near-octahedral shape which is formed by lacking a portion of these shapes) (Invention 4).

Also, according to the present invention, there is provided the process for producing the positive electrode active substance particles as described in the above Invention 3, wherein the crystal plane growth inhibitor is a phosphorus compound and/or an aluminum compound (Invention 5).

Further, according to the present invention, there is provided a non-aqueous electrolyte secondary battery comprising the positive electrode active substance particles as described in the above Invention 1 or 2 (Invention 6).

Effect of the Invention

The positive electrode active substance particles according to the present invention are excellent in packing property as well as load characteristics and high-temperature characteristics and, therefore, can be suitably used as a positive electrode active substance for non-aqueous electrolyte secondary batteries.

PREFERRED EMBODIMENTS FOR CARRYING OUT THE INVENTION

Figure 1:
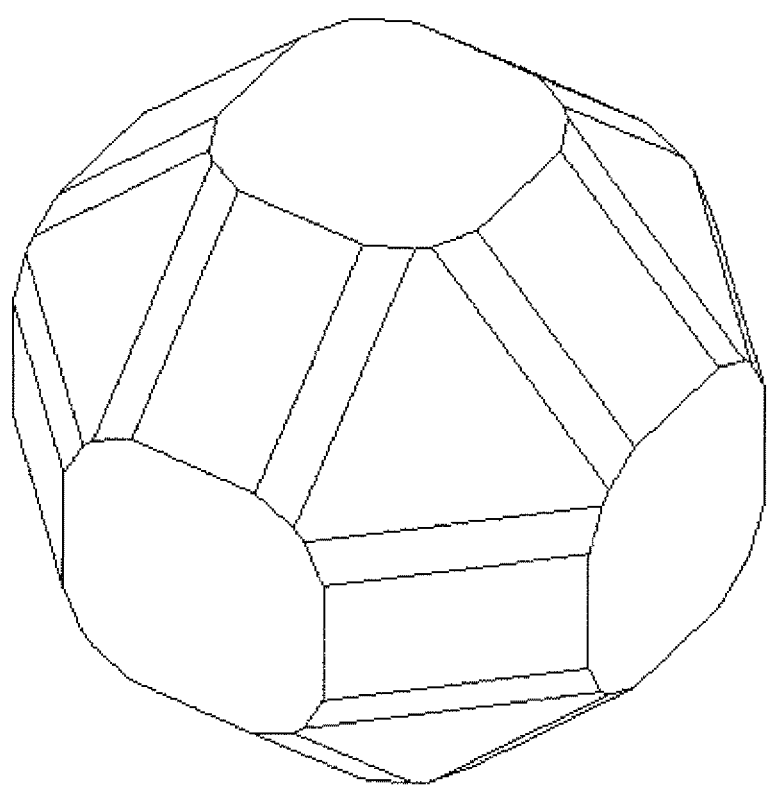
FIG. 1 is a model view of a particle having a dodecahedral or higher-polyhedral shape.

First, the positive electrode active substance particles according to the present invention are described.

The positive electrode active substance particles according to the present invention comprises lithium manganate (stoichiometric composition: $LiMn_2O_4$) comprising Li and Mn as main components and having a cubic spinel structure (Fd-3m (No. 227)). However, the positive electrode active substance of the present invention is not particularly limited to those having the above stoichiometric composition, and may also include those substances in which anions are deficient or excessive, or oxygen ions are deficient or excessive, as long as the crystal structure can be maintained.

Meanwhile, in the positive electrode active substance particles according to the present invention, a part of Mn may be substituted with the other metal element, for example, one or more anions selected from the group consisting of Li, Fe, Mn, Ni, Mg, Zn, B, Al, Co, Cr, Si, Sn, V and Sb, etc.

In the present invention, in particular, when using a phosphorus compound and/or an aluminum compound as a crystal plane growth inhibitor, it is possible to obtain the positive electrode active substance particles having a desired shape. The content of the phosphorus component in the positive electrode active substance particles according to the present invention is preferably 0.0001 to 0.05 in terms of a molar ratio of P based on Mn. The content of the aluminum component in the positive electrode active substance particles according to the present invention is preferably 0.01 to 0.5 in terms of a molar ratio of Al based on Mn.

In this case, in particular, when using the positive electrode active substance having a ratio of Li to a sum of Mn and the substituting metal element [Li/(Mn+substituting metal element)] of not less than 0.5 among the above $Li_2MnO_4$ compositions, the resulting secondary battery can be further lowered in internal resistance and can be enhanced in output as compared to those using the positive electrode active substance having the above stoichiometric composition. The $LiMn_2O_4$ having a Li/Mn ratio of more than 0.5 include, for example, $Li(Li_xMn_{2-x})O_4$ wherein x is an amount of the substituting metal element, which is obtained by substituting a part of Mn with Li as the substituting metal element. The ratio [Li/(Mn+substituting metal element)] is preferably 0.5 to 0.65.

The primary particles of the positive electrode active substance particles according to the present invention have a dodecahedral or higher-polyhedral shape in which none of the crystal planes equivalent to the (111) plane are located adjacent to each other, and flat crystal planes are crossed with each other to form a clear ridge.

In general, the positive electrode active substance may be molded into a plate shape by a press-molding method, or may be molded by applying a slurry prepared by adding the positive electrode active substance and a conductive assistant to a solvent in which a binder is dissolved, onto a surface of a metal foil. In this case, as the amount of the positive electrode active substance contained per a unit volume of the resulting molded product becomes larger, the capacity of the obtained positive electrode can be increased. Therefore, it is desirable to increase a packing density of the positive electrode active substance.

In view of the closest packing structure, when one particle is defined as a rigid sphere, the packing rate of the positive electrode active substance particles is 74%. The packing rate of particles having a regular octahedral shape as an automorphic shape of the lithium manganate is about 67% when calculated in the same manner as above. Therefore, it is considered that the packing property of the positive electrode active substance particles can be further increased by forming the primary particles thereof into a polyhedral shape much closer to a sphere.

The positive electrode active substance particles according to the present invention have neither an octahedral shape as an automorphic shape of the cubic spinel structure nor any shapes similar thereto. In the particles having an octahedral shape as an automorphic shape of the lithium manganate, the rate of growth of the {111} plane is slower than those of the other crystal planes during a crystal growth of the particles, so that the octahedral particles are constituted from the {111} plane. Therefore, in order to well control a shape of the particles, crystal growth of the crystal planes other than the {111} plane is suppressed, whereby it is possible to allow the crystal planes which are usually dissipated during the crystal growth to remain on the particles.

In the particles having an octahedral shape as an automorphic shape of the lithium manganate, the angle between the crystal planes equivalent to the (111) plane is 109.15°. In the polyhedral particles having a dodecahedral or higher-polyhedral shape according to the present invention in which crystal growth of the (110) plane, the (111) plane and the crystal planes equivalent to these planes is suppressed, and the crystal planes equivalent to the (111) plane are prevented from being located adjacent to each other, the angle between any crystal planes thereof is larger than 109.15°.

In this regard, an example of a model of the polyhedral particles is shown in FIG. 1. In addition, in FIG. 2 to FIG. 5, there are shown various shapes of the positive electrode active substance particles according to the present invention. The respective polyhedral particles as shown therein are particles having 12 or more planes in which crystal growth of the (100) plane, the (110) plane, the (221) plane and the planes equivalent to these planes in the octahedron as an automorphic shape of the lithium manganate is suppressed. The polyhedral particles shown in FIG. 1 is only illustrative, and may also comprise any polyhedral particles including crystal planes other than the {111} plane, the {221} plane, the {110} plane and the {100} plane.

Also, it is expected that such polyhedral particles have the effect of enhancing an efficiency of insertion and desorption of lithium ions therein. When noting the Li atoms in the manganese spinel crystal structure, it is considered that the insertion and desorption of Li ions are more efficiently caused in the <110> direction. Therefore, it is suggested that the [110] plane perpendicular to the <110> direction is the plane having the highest Li ionic conductivity. For this reason, it is desirable that the clear {110} plane remains in a state surrounded by ridges by controlling growth of the crystal plane.

The dodecahedral or higher-polyhedral particles according to the present invention may also include those particles formed by allowing primary particles to cross with each other, those particles in which crystal planes are commonly shared among a plurality of primary particles, or one primary particle is grown from a part of a surface of the other primary particle, those particles which are formed by lacking a portion of these particle shapes, and those particles produced by sharing crystal planes among primary particles in a complicated manner.

The positive electrode active substance particles according to the present invention have the particle shape as defined in the above Invention 1. However, the positive electrode active substance particles may also comprise primary particles having the other shape such as an octahedral shape and a granular shape as long as the secondary battery produced using the particles is excellent in capacity recovery rate, high-temperature cycle capacity and rate characteristic. More specifically, the definition that the "primary particles have a dodecahedral or higher-polyhedral shape in which none of the crystal planes equivalent to the (111) plane are located adjacent to each other, and flat crystal planes are crossed with each other to form clear ridge" according to the present invention means that the content of the polyhedral particles as defined above in the whole positive electrode active substance particles is not less than 75% and preferably not less than 95%. Meanwhile, the content of the polyhedral particles as used above means the proportion of the number of the particles which are recognized to have the above polyhedral shape relative to the number of the whole particles observed on the below-mentioned scanning electron micrograph.

The positive electrode active substance particles according to the present invention have an average primary particle diameter of not less than 1 μm and not more than 20 μm, preferably 1.2 to 10 μm and more preferably 1.3 to 8 μm.

The average secondary particle diameter (D50) of the positive electrode active substance particles according to the present invention is adjusted such that the ratio of the average secondary particle diameter (D50) of the positive electrode active substance particles to an average secondary particle diameter (D50) of the manganese compound as a precursor thereof is not more than 1.35. When the ratio of the average secondary particle diameter (D50) of the positive electrode active substance particles to that of the precursor particles is more than 1.35, the primary particles of the positive electrode active substance particles tend to be excessively grown, so that the resulting secondary battery tends to be deteriorated in output. Further, the primary particles tend to be aggregated together, so that elution of Mn tends to be promoted from the aggregated portions, resulting in deteriorated high-temperature characteristics of the resulting secondary battery. The ratio of the average secondary particle diameter (D50) of the positive electrode active substance particles to that of the precursor particles is preferably not more than 1.33 and more preferably not more than 1.30.

The positive electrode active substance particles according to the present invention have a BET specific surface area of 0.3 to 1.5 m$^2$/g. When the BET specific surface area of the positive electrode active substance particles is less than 0.3 m$^2$/g, the resulting particles tend to suffer from promoted aggregation therebetween and tends to be therefore deteriorated in stability. When the BET specific surface area of the positive electrode active substance particles is more than 1.5 m$^2$/g, the resulting particles tend to be unstable by themselves. The BET specific surface area of the positive electrode active substance particles is preferably 0.35 to 1.3 m$^2$/g and more preferably 0.4 to 1.2 m$^2$/g.

The positive electrode active substance particles according to the present invention preferably have a packing density (when tapped 500 times) of not less than 1.8 g/cm$^3$. When the packing density of the positive electrode active substance particles is less than 1.8 g/cm$^3$, the electrode obtained using the positive electrode active substance particles tends to be deteriorated in packing property, so that it may be difficult to attain a high capacity of the resulting battery. When the packing density of the positive electrode active substance particles is more preferably not less than 1.85 g/cm$^3$.

The positive electrode active substance particles according to the present invention preferably have a compressed density of not less than 2.85 g/cm$^3$ when applying a pressure of 3 ton/cm$^2$ thereto. When the compressed density of the positive electrode active substance particles is less than 2.85 g/cm$^3$, the obtained particles tend to be deteriorated in packing property, so that it may be difficult to attain a high capacity of the resulting battery. The compressed density of the positive electrode active substance particles is more preferably not less than 2.90 g/cm$^3$.

The positive electrode active substance particles according to the present invention have a lattice constant of 0.8185 to 0.822 nm as measured by a Rietveld method.

The primary particles of the positive electrode active substance particles according to the present invention are constituted from substantially a single crystal. When the primary particles of the positive electrode active substance particles are constituted of a polycrystal, a large number of lattice-unconformity planes acting as a resistance component against the insertion and desorption of Li tend to be present in the crystals, so that it may be difficult to allow the resulting battery to generate a sufficient output.

Next, the method of producing a positive electrode using the positive electrode active substance particles according to the present invention is described.

When producing the positive electrode using the positive electrode active substance particles according to the present invention, a conducting agent and a binder are added to and mixed with the positive electrode active substance particles by an ordinary method. Examples of the preferred conducting agent include acetylene black, carbon black and graphite. Examples of the preferred binder include polytetrafluoroethylene and polyvinylidene fluoride.

The secondary battery produced by using the positive electrode active substance particles according to the present invention comprises the above positive electrode, a negative electrode and an electrolyte.

Examples of a negative electrode active substance for the negative electrode include metallic lithium, lithium/aluminum alloys, lithium/tin alloys, and graphite or black lead.

Also, as a solvent for the electrolyte solution, there may be used combination of ethylene carbonate and diethyl carbonate, as well as an organic solvent comprising at least one compound selected from the group consisting of carbonates such as propylene carbonate and dimethyl carbonate, and ethers such as dimethoxyethane.

Further, as the electrolyte, there may be used a solution prepared by dissolving, in addition to lithium phosphate hexafluoride, at least one lithium salt selected from the group consisting of lithium perchlorate, lithium borate tetrafluoride and the like in the above solvent.

In addition, the battery characteristics of the positive electrode active substance particles according to the present invention are evaluated as follows. That is, the evaluation for the battery characteristics is carried out using a non-aqueous electrolyte secondary battery of a CR2032 type which is produced from the positive electrode active substance particles, a non-aqueous electrolyte solution (mixed solution comprising EC and DEC; mixing ratio of EC:DEC=3:7) to which 1 mol/L LiPF$_6$ is added, and a 500 μm-thick Li foil as a negative electrode.

The secondary battery produced using the positive electrode active substance particles according to the present invention has an initial discharge capacity of 80 to 120 mAh/g. When the initial discharge capacity is less than 80 mAh/g, the secondary battery tends to be hardly used in practice owing to a low output therefrom. When the initial discharge capacity is more than 120 mAh/g, the secondary battery tends to hardly maintain a sufficient stability. The initial discharge capacity of the secondary battery is preferably 90 to 115 mAh/g.

The secondary battery produced using the positive electrode active substance particles according to the present invention preferably has a high-temperature cycle capacity retention rate of not less than 90%. The high-temperature cycle capacity retention rate of the secondary battery is more preferably not less than 93% and still more preferably not less than 95%.

The secondary battery produced using the positive electrode active substance particles according to the present invention preferably has a capacity recovery rate of not less than 95% and more preferably not less than 97%.

The secondary battery produced using the positive electrode active substance particles according to the present invention preferably has a rate characteristic of not less than 90%, more preferably not less than 93% and still more preferably not less than 95%.

Next, the process for producing the positive electrode active substance particles according to the present invention is described.

The positive electrode active substance particles according to the present invention are produced by mixing a manganese compound, a lithium compound and a crystal plane growth inhibitor, if required, together with a substituting metal element compound, and then calcining the resulting mixture in a temperature range of not lower than 800° C., and preferably 800 to 1050° C.

Figure 6:
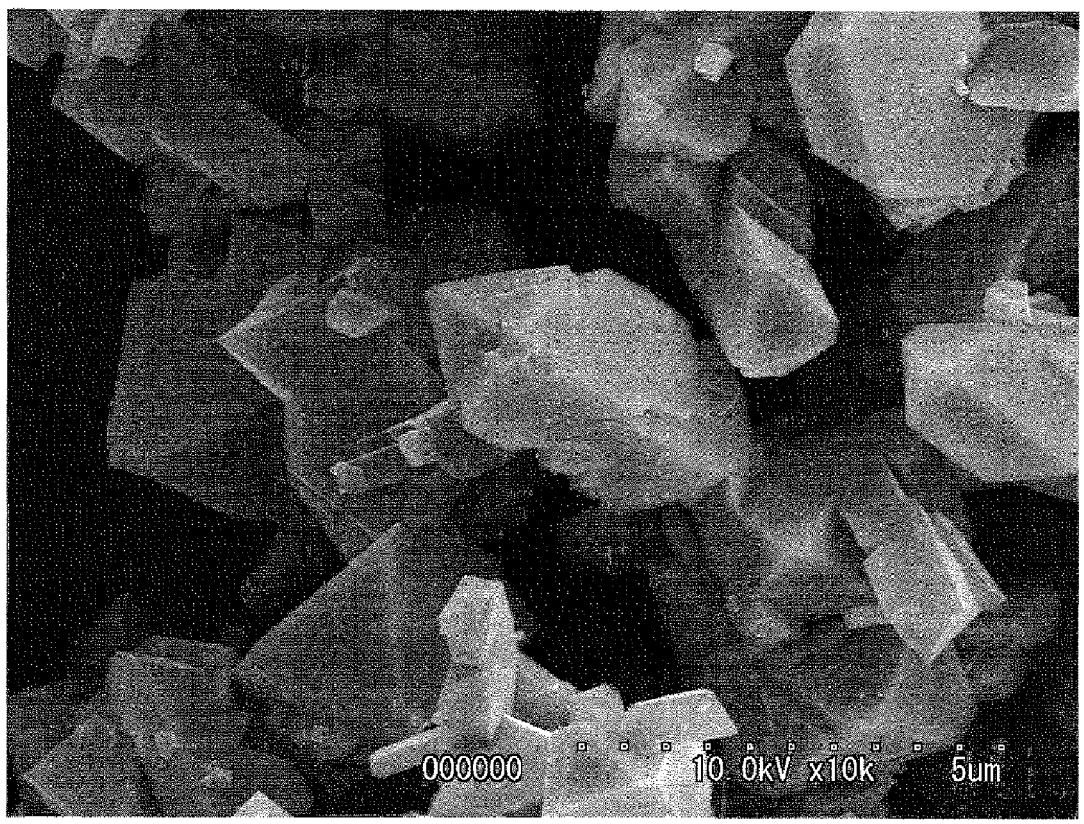
FIG. 6 is an electron micrograph showing manganese oxide particles obtained in Example 1.
Figure 7:
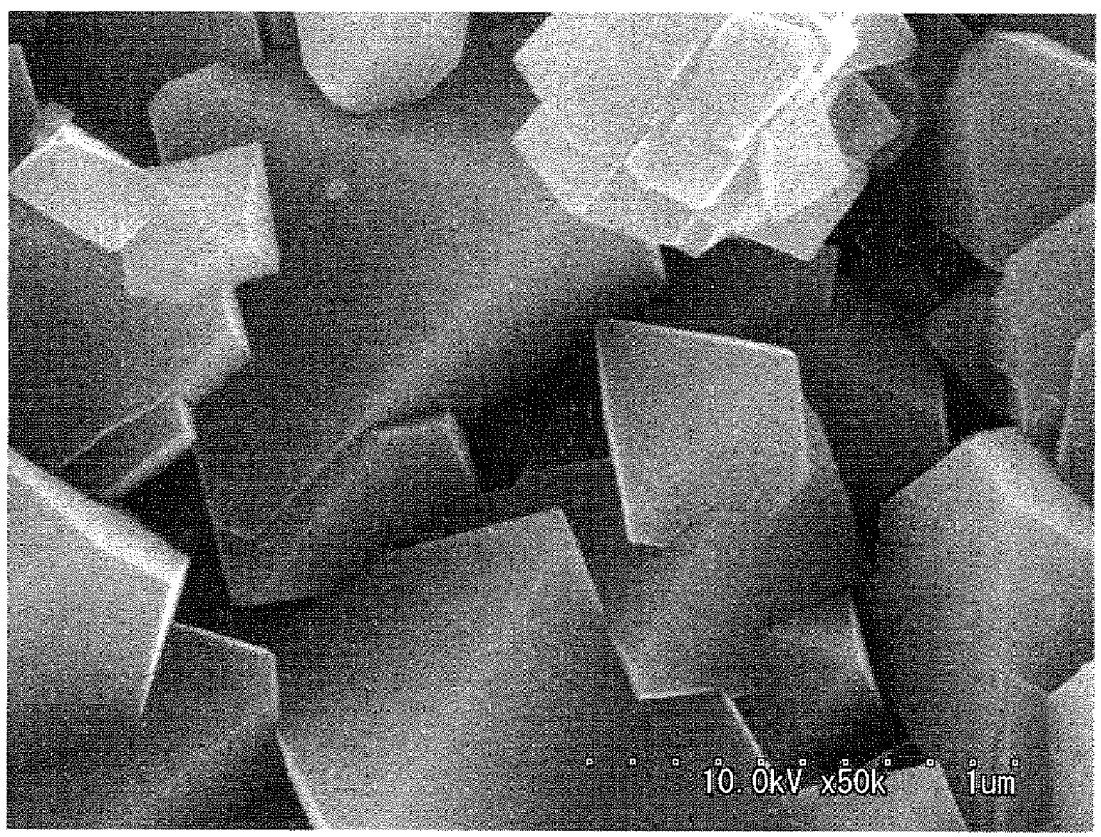
FIG. 7 is an electron micrograph showing lithium manganate having an octahedral shape.

Examples of the manganese compound used in the present invention include trimanganese tetraoxide ($Mn_3O_4$), manganese dioxide ($\gamma$-$MnO_2$, $\beta$-$MnO_2$), dimanganese trioxide, manganese carbonate, manganese chloride and manganese sulfate. Among these manganese compound, trimanganese tetraoxide ($Mn_3O_4$) is especially preferred. The trimanganese tetraoxide ($Mn_3O_4$) preferably has an average primary particle diameter of 0.5 to 20 μm and more preferably 1 to 10 μm and a BET specific surface area of 0.5 to 15 m$^2$/g, and the shape of the trimanganese tetraoxide ($Mn_3O_4$) is preferably an octahedral shape or a generally octahedral shape. The "generally octahedral shape" as used herein means any of an octahedral shape close to a regular octahedral shape in which flat crystal planes are crossed with each other to form a clear ridge; a near-octahedral shape in which a portion at which four planes of an octahedron are crossed with each other forms not a complete apex but a plane or a ridge; a near-octahedral shape in which a portion at which two planes of an octahedron are crossed with each other forms not a complete ridge but a plane; and a near-octahedral shape which is formed by lacking a portion of these shapes. In addition, the particles having an octahedral shape or a generally octahedral shape may also include such particles in which crystal planes are shared among primary particles, or a primary particle crystal is grown form a part of a surface of the other primary particle. FIG. 6 shows an electron micrograph of trimanganese tetraoxide particles having an octahedral shape.

The substituting metal element used in the present invention includes at least one metal element other than Li and Mn with which the Mn (16d) site can be substituted. Any metal elements may be used as the substituting metal element as long as they reduce an amount of trivalent manganese ($Mn^{3+}$) in the manganese spinel positive electrode active substance to control a charge/discharge capacity of the resulting battery and thereby improve charge/discharge cycle characteristics and high-temperature characteristics thereof. The substituting metal element is preferably Al or Mg. These substituting metal elements are preferably uniformly dispersed within the respective positive electrode active substance particles according to the present invention. When the substituting metal elements are unevenly localized in the respective particles, the non-aqueous electrolyte secondary battery produced using the positive electrode active substance particles tends to be deteriorated in stability.

As the crystal plane growth inhibitor used in the present invention, there may be mentioned a phosphorus compound and an aluminum compound. Examples of the phosphorus compound include ammonium dihydrogen phosphate ($NH_4H_2PO_4$), lithium phosphate, calcium phosphate, trisodium phosphate and sodium dihydrogen phosphate. Examples of the aluminum compound include aluminum hydroxide ($Al(OH)_3$), aluminum chloride and aluminum sulfate. The phosphorus compound may be used in combination with the aluminum compound. Among these compounds, preferred are phosphorus compounds, and especially preferred is ammonium dihydrogen phosphate ($NH_4H_2PO_4$). The phosphorus compound preferably has an average secondary particle diameter (D50) of 1 to 50 μm.

The amount of the phosphorus compound added may be 0.01 to 0.7 mol % in terms of P based on Mn. When the amount of the phosphorus compound added is less than 0.01 mol % based on Mn, no sufficient effect by the addition of the phosphorus compound tends to be attained. When the amount of the phosphorus compound added is more than 0.7 mol % based on Mn, an excessive amount of P added tends to form a compound which will act as a resistance component on the surface of the resulting positive electrode active substance particles. The amount of the phosphorus compound added is preferably 0.02 to 0.5 mol % and more preferably 0.02 to 0.3 mold.

In the present invention, Al as the substituting metal element also has an effect of the crystal plane growth inhibitor. The positive electrode active substance comprising Al may be produced by the method of mixing the manganese compound, the lithium compound and the aluminum compound with each other at a predetermined mixing ratio and then calcining the resulting mixture in a temperature range of 800 to 1050° C., the method of previously coating the surface of respective particles of the manganese compound with the aluminum compound, mixing the resulting coated particles with the lithium compound, and then calcining the resulting mixture in the above temperature range, or the like.

In the present invention, when the positive electrode active substance is produced using only the aluminum compound as the crystal plane growth inhibitor, the average secondary particle diameter of the manganese compound as one of the starting materials is preferably as small as possible, and is, for example, 1.0 to 2.5 μm.

<Function>

In accordance with the present invention, the positive electrode active substance particles having the above properties can be produced by uniformly mixing a manganese compound, a lithium compound and a crystal plane growth inhibitor with each other and then calcining the resulting mixture in air at a temperature of 800 to 1050° C.

As a result, it is considered that the secondary battery produced using the positive electrode active substance particles according to the present invention can be enhanced in electrode packing property or high-temperature characteristics such as effect of preventing elution of Mn, and at the same time can be improved in output characteristics.

EXAMPLES

Typical examples of the present invention are described in more detail below.

The average primary particle diameter of the particles was expressed by an average value of diameters of the particles which were observed using a scanning electron microscope "SEM-EDX" equipped with an energy disperse type X-ray analyzer (manufactured by Hitachi High-Technologies Corp.) and read out from a SEM image thereof.

The average secondary particle diameter ($D_{50}$) of the particles was determined from a volume median particle diameter as measured by a wet laser method using a laser type particle size distribution measuring apparatus "MICROTRACK HRA" manufactured by Nikkiso Co., Ltd.

The BET specific surface area of the particles was measured as follows. That is, a sample was dried and deaerated under a nitrogen gas atmosphere at 120° C. for 45 min, and the BET specific surface area of the thus treated sample was measured using "MONOSORB" manufactured by Yuasa Ionics Inc.

The packing density of the positive electrode active substance particles was measured as follows. That is, 40 g of the particle were weighed and charged into a 50 $cm^3$ measuring cylinder, and then tapped 500 times using a "TAP DENSER" manufactured by Seishin Enterprises Co., Ltd., to read out a volume of the tapped particles and calculate a packing density of the particles therefrom.

The compressed density of the positive electrode active substance particles was determined as follows. That is, 1 g of the particles was charged into a ϕ10 metal mold, and compressed therein while increasing a pressure applied thereto by each 0.5 $t/cm^2$ in the range of from 1 to 4 $t/cm^2$. The value of a density of the particles as measured upon applying a pressure of 3 $t/cm^2$ thereto was used as the compressed density.

The X-ray diffraction of the sample was measured using "RAD-IIA" manufactured by Rigaku Co., Ltd.

The lattice constant was calculated from the results of the above powder X-ray diffraction by a Rietveld method.

Whether the crystal structure of the particles was a single crystal or not was confirmed by observing an oriented plane of a section of the particles by EBSD analysis.

<Evaluation of Battery Characteristics of Positive Electrode Active Substance>

The coin cell of a CR2032 type was produced by using the positive electrode active substance particles according to the present invention, and the battery characteristics of the thus produced coin cell were evaluated. First, 92% by weight of an Li—Mn composite oxide as a positive electrode active substance, 2.5% by weight of acetylene black as a conducting material, and 3% by weight of polyvinylidene fluoride dissolved in N-methylpyrrolidone as a binder, were mixed with each other, and the resulting mixture was applied onto an Al metal foil and then dried at 110° C. The thus obtained sheets were each blanked into 16 mmϕ and then compression-bonded together by applying a pressure of 1.7 $t/cm^2$ thereto, thereby producing an electrode having a thickness of 50 μm and using the thus produced electrode as a positive electrode. A 500 μm-thick metallic lithium blanked into 16 mmϕ was used as a negative electrode, and a solution prepared by mixing EC and DEC with each other at a volume ratio of 3:7 in which 1 mol/L of $LiPF_6$ was dissolved, was used as an electrolyte solution, thereby producing the coin cell of a CR2032 type.

The capacity recovery rate of the thus produced coin cell of a CR2032 type was evaluated in the following manner. That is, the coin cell was subjected to CC-CV charging at a current density of 0.1 C until reaching 4.3 V, and then discharged at 0.1 C until reaching 3.0 V. The discharge capacity of the coin cell upon the above charge/discharge cycle was expressed by "a". Next, the coin cell was charged until reaching a charge depth of 50% (SOC: 50%). Thereafter, the coin cell was allowed to stand at 60° C. for one week, taken out, and then discharged at 0.1 C until reaching 3.0 V. Then, the coin cell was subjected to charging and discharging at 0.1 C to measure a discharge capacity (d) of the coin cell. The capacity recovery rate of the coin cell was calculated from the formula: 100×d/a.

The high-temperature cycle capacity retention rate of the above coin cell of a CR2032 type was evaluated as follows. That is, the coin cell was subjected to charging and discharging at 1 C in the range of from 3.0 to 4.3 V (the discharge capacity obtained thereupon was expressed by "a"), and then repeatedly subjected to twenty nine (29) charging and discharging cycles at 1 C in the range of from 3.0 to 4.3 V (in which CC-CV charging and CC-CC discharging were respectively repeated), and the discharge capacity at the 29th cycle was expressed by "b". The cycle capacity retention rate of the coin cell was calculated from the formula: b/a×100(%).

Further, the rate characteristic of the above coin cell of a CR2032 type was evaluated as follows. That is, the coin cell was subjected to charging and discharging cycles at 25° C. in a voltage range of 3.0 to 4.3 V in which the charging was conducted at a current density of 0.1 C (CC-CV), whereas the discharging was conducted at a current density of 0.1 C, 0.2 C, 0.5 C, 1.0 C, 2.0 C and 5.0 C. At this time, the value of a discharge capacity at 0.1 C was expressed by "e", and the value of a discharge capacity at 5.0 C was expressed by "f". The rate characteristic of the coin cell was calculated from the formula: f/e×100(%).

Example 1

Production of Positive Electrode Active Substance Particles

Under a nitrogen flow, 0.5 mol of manganese sulfate was added to 3.5 mol of sodium hydroxide to prepare a reaction solution having a total volume of 1 L. Manganese hydroxide thus produced was aged at 90° C. for 1 hr. After completion of the aging, air was passed through the reaction solution to oxidize manganese hydroxide at 90° C., and the resulting product was washed with water and then dried, thereby obtaining manganese oxide particles.

The thus obtained manganese oxide particles were $Mn_3O_4$ and had an octahedral particle shape as shown in FIG. 6. In addition, the manganese oxide particles had an average secondary particle diameter of 5.2 μm and a BET specific surface area of 0.6 $m^2/g$.

The above manganese oxide ($Mn_3O_4$), lithium carbonate ($Li_2CO_3$) and aluminum hydroxide ($Al(OH)_3$) were weighed such that a molar ratio of Li:Mn:Al was 1.073:1.830:0.096, and further ammonium dihydrogen phosphate ($NH_4H_2PO_4$) was weighed in an amount of 0.05 mold in terms of P based on Mn, and the thus weighed compounds were mixed with each other, and then calcined in atmospheric air at 960° C. for 3 hr to thereby obtain lithium manganate particles.

Figure 2:
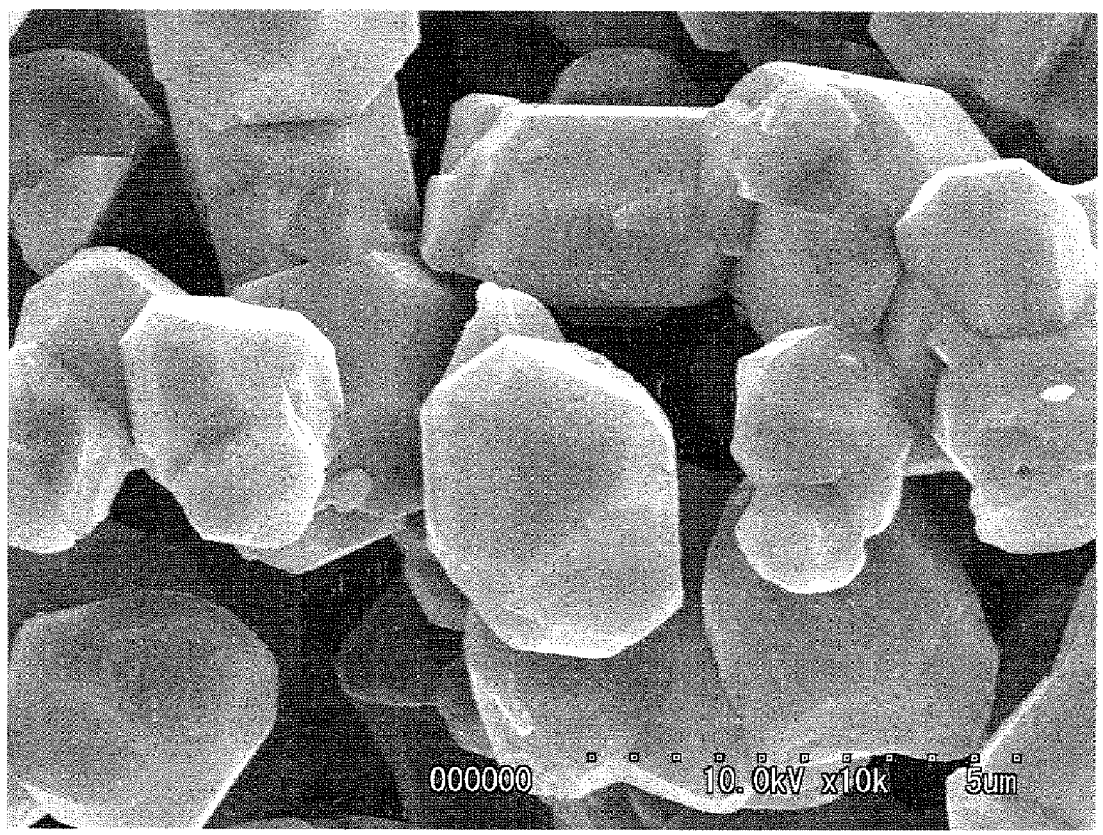
FIG. 2 is an electron micrograph showing positive electrode active substance particles obtained in Example 1.

As a result of XRT diffraction analysis (using "RAD-IIA" manufactured by Rigaku Corp.), it was confirmed that the thus obtained lithium manganate particles comprised no different phases. In addition, as a result of observing an SEM image of the lithium manganate particles (using an SEM manufactured by Hitachi High-Technologies Corp.), it was confirmed that the particles had a polyhedral shape as shown in FIG. 2. That is, the primary particles of the lithium manganate particles exhibited neither an octahedral shape nor a shape close thereto, and had such a polyhedral shape which was constituted from flat crystal planes including the (111) plane, (221) plane, (110) plane, (100) plane and crystal planes equivalent to these planes, and in which none of the crystal planes equivalent to the (111) plane were located adjacent to each other, the flat crystal planes were crossed with each other to form a clear ridge, and the angle between any adjacent ones of the crystal planes was an obtuse angle larger than 109.15° which was an angle between the crystal planes equivalent to the (111) plane when expressed as an obtuse angle. The proportion of the number of the above polyhedral particles relative to the number of the whole lithium manganate particles was about 98%.

The resulting lithium manganate particles had an average primary particle diameter of 5 μm and an average secondary particle diameter (D50) of 6.2 μm, and the ratio of the above average secondary particle diameter (D50) of the lithium manganate particles to an average secondary particle diameter (D50) of a precursor thereof was 1.19. Further, the lithium manganate particles had a BET specific surface area of 0.74 $m^2/g$, a packing density of 1.91 $g/cm^3$ and a compressed density of 2.96 $g/cm^3$.

The coin type battery produced by using a positive electrode active substance comprising the thus obtained lithium manganate particles had an initial discharge capacity of 105 mAh/g, a capacity recovery rate of 98%, a high-temperature cycle capacity retention rate of 97% and a rate characteristic of 96%.

Comparative Example 1

The same procedure as defined in Example 1 was conducted except that MgO was used as the substituting metal element compound, and the amounts of the respective components added and the calcination temperature were changed, thereby obtaining a positive electrode active substance comprising lithium manganate particles. As a result, it was confirmed that the primary particles of the thus obtained lithium manganate particles had an octahedral shape, and the proportion of the number of the above polyhedral particles to the number of the whole lithium manganate particles was about 70%.

Examples 2 and 3 and Comparative Example 2

Figure 3:
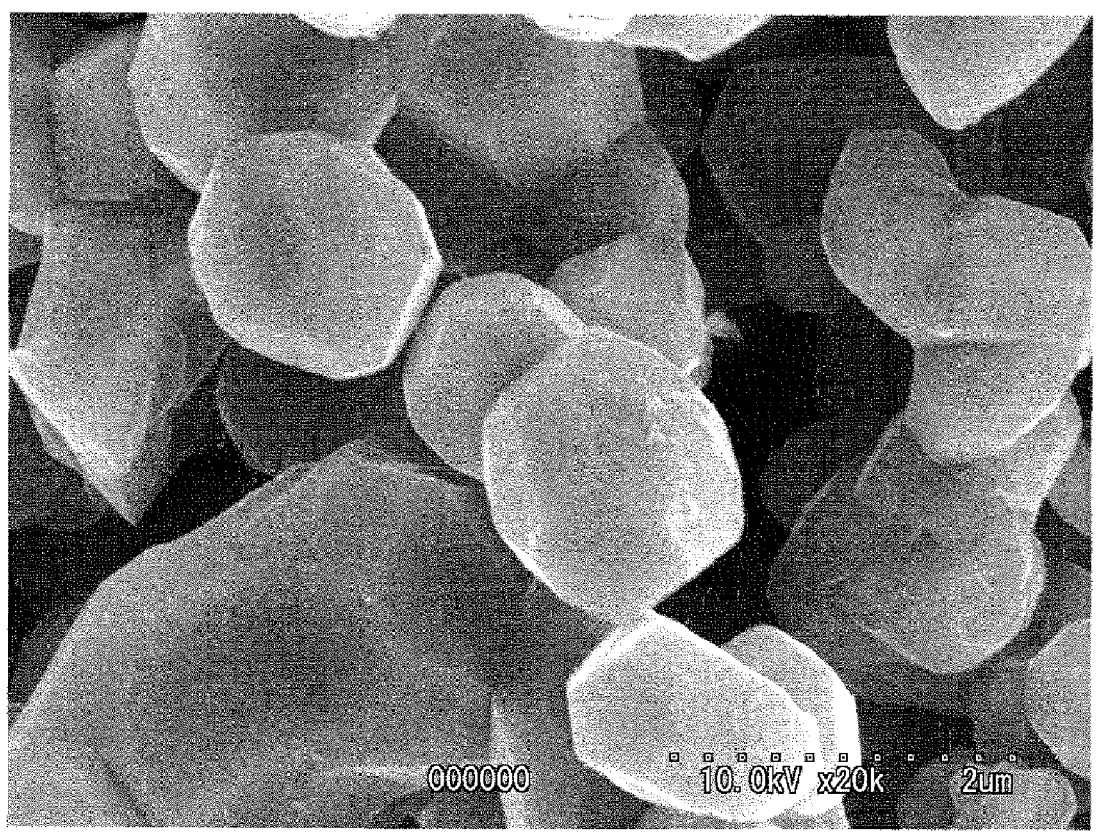
FIG. 3 is an electron micrograph showing positive electrode active substance particles obtained in Example 3.
Figure 4:
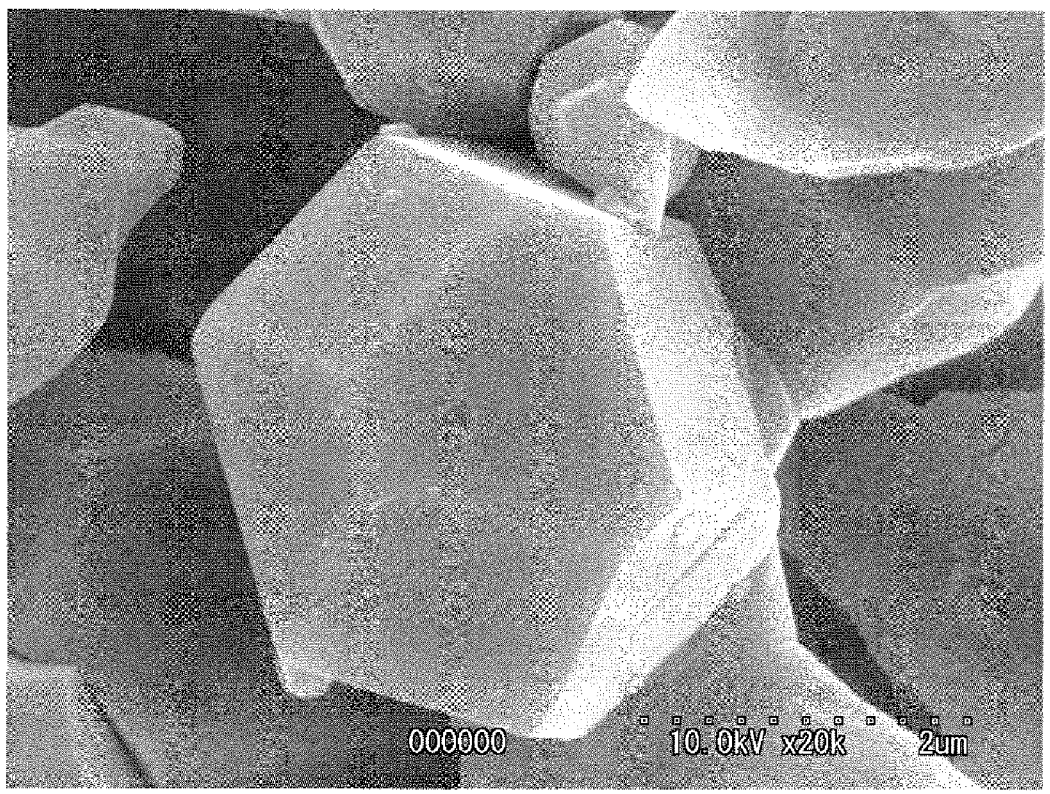
FIG. 4 is an electron micrograph showing positive electrode active substance particles according to the present invention.
Figure 5:
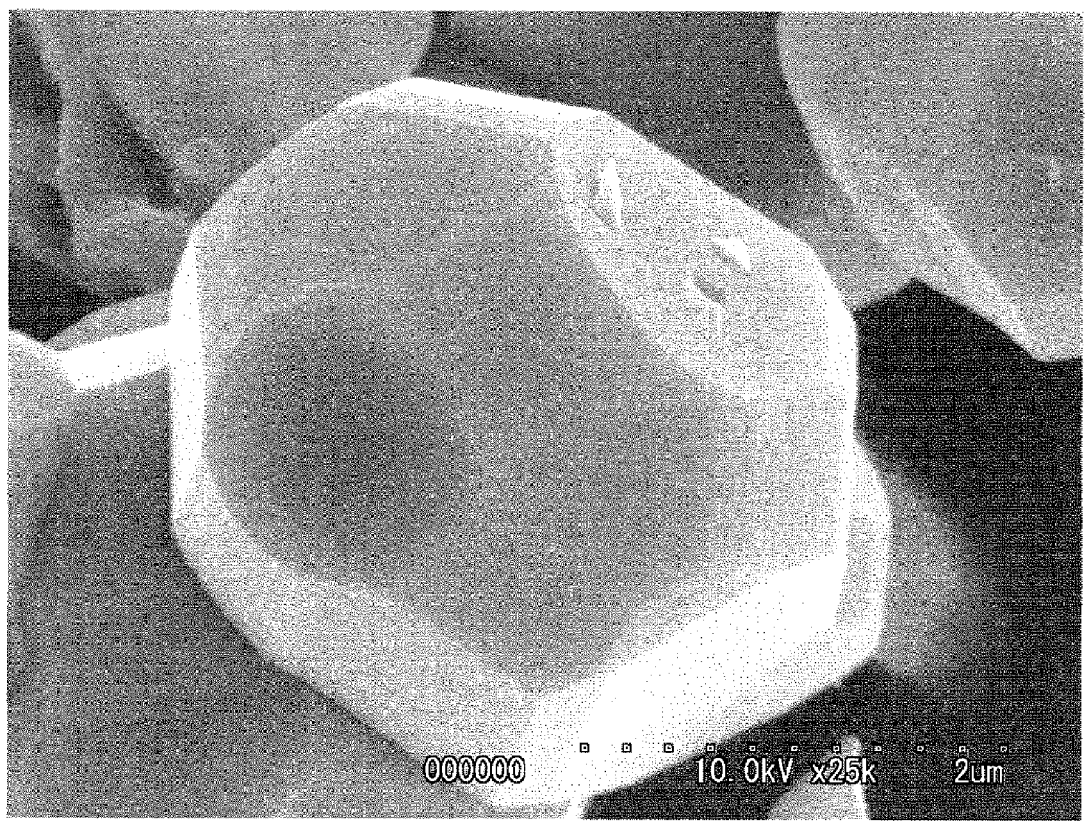
FIG. 5 is an electron micrograph showing positive electrode active substance particles according to the present invention.
Figure 8:
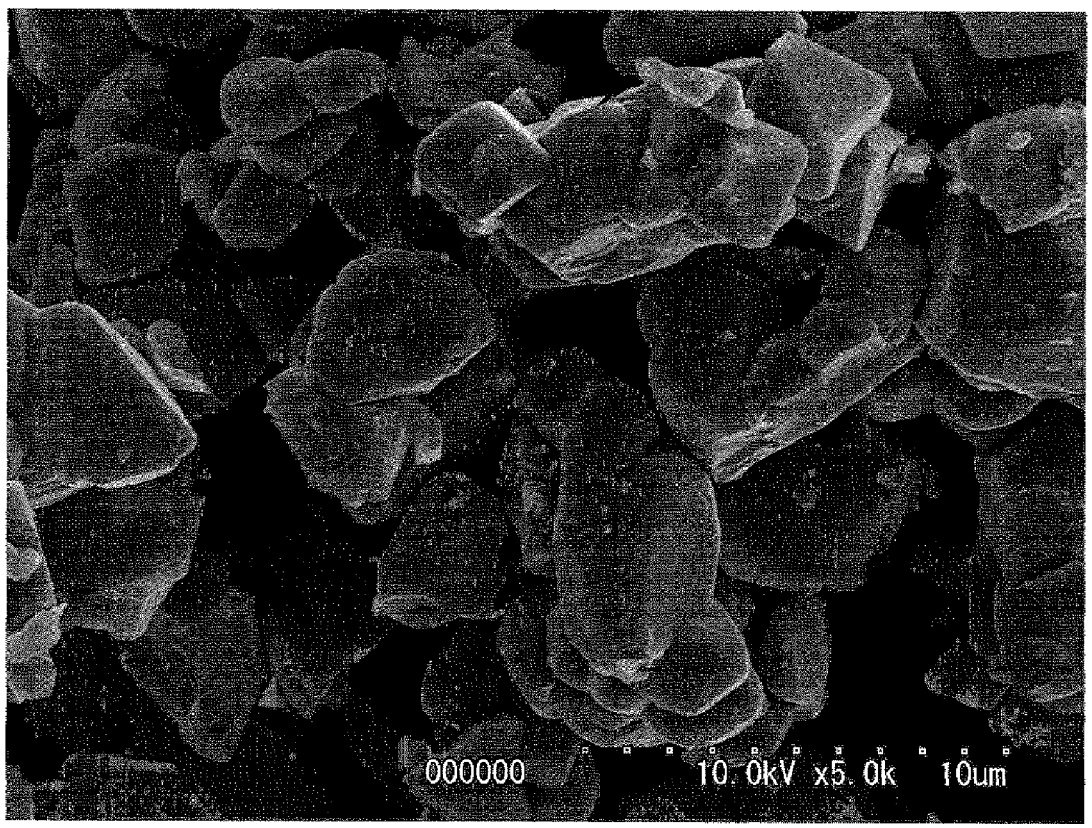
FIG. 8 is an electron micrograph showing positive electrode active substance particles obtained in Comparative Example 2.

The same procedure as defined in Example 1 was conducted except that the substituting metal elements used, the kinds and amounts of the respective additive element compounds and the calcination temperature were changed variously, thereby obtaining positive electrode active substances comprising lithium manganate particles. The production conditions used in the Examples and Comparative Example are shown in Table 1, and various properties of the thus obtained lithium manganate particles are shown in Table 2. As a result, it was confirmed that even the primary particles of the lithium manganate particles thus obtained in Examples 2 and 3 had the same polyhedral shape as those obtained in Example 1. In FIG. 3, there is shown an electron micrograph of the lithium manganate particles obtained in Example 3. It was confirmed that the proportion of the number of the polyhedral particles to the number of the whole lithium manganate particles was about 97%. Also, in FIG. 8, there is shown an electron micrograph of the lithium manganate particles obtained in Comparative Example 2. As shown in FIG. 8, it was confirmed that the primary particles of the lithium manganate particles obtained in Comparative Example 2 had a rounded shape, and the proportion of the number of the rounded polyhedral particles to the number of the whole lithium manganate particles was about 20%.

TABLE 1

| Examples and Comp. Examples | Precursor Kind of Mn compound (—) | Precursor Average secondary particle diameter (μm) | Mixing Substituting metals and additive elements, (—) | Mixing and ratios to Mn (—) |
|---|---|---|---|---|
| Example 1 | $Mn_3O_4$ | 5.2 | Al/P | 0.05/0.0005 |
| Example 2 | $Mn_3O_4$ | 5.2 | Al/P | 0.05/0.001 |
| Example 3 | $Mn_3O_4$ | 2.4 | Al | 0.05 |
| Comp. Example 1 | $Mn_3O_4$ | 5.2 | Mg | 0.025 |
| Comp. Example 2 | $Mn_3O_4$ | 5.2 | Al/B | 0.05/0.015 |

| Examples and Comp. Examples | Mixing Li/(Mn + substituting metal) (—) | Mixing Kind of substituting metal compound (—) | Mixing Kind of additive element compound (—) |
|---|---|---|---|
| Example 1 | 0.556 | $Al(OH)_3$ | $NH_4H_2PO_4$ |
| Example 2 | 0.556 | $Al(OH)_3$ | $NH_4H_2PO_4$ |
| Example 3 | 0.556 | $Al(OH)_3$ | — |
| Comp. Example 1 | 0.545 | MgO | — |
| Comp. Example 2 | 0.556 | $Al(OH)_3$ | $H_3BO_3$ |

| Examples and Comp. Examples | Calcination conditions Temperature in air (° C.) | Calcination conditions Time (hr) |
|---|---|---|
| Example 1 | 960 | 3 |
| Example 2 | 960 | 3 |
| Example 3 | 910 | 3 |
| Comp. Example 1 | 870 | 3 |
| Comp. Example 2 | 960 | 3 |

TABLE 2

| Examples and Comp. Examples | Composition of positive electrode active substance | Precursor Average secondary particle diameter (μm) |
|---|---|---|
| Example 1 | $Li_{1.072}Mn_{1.828}Al_{0.1}O_4 + 0.00092P$ | 5.2 |
| Example 2 | $Li_{1.072}Mn_{1.828}Al_{0.1}O_4 + 0.00183P$ | 5.2 |
| Example 3 | $Li_{1.072}Mn_{1.828}Al_{0.1}O_4$ | 2.4 |
| Comp. Example 1 | $Li_{1.065}Mn_{1.905}Mg_{0.05}O_4$ | 5.0 |
| Comp. Example 2 | $Li_{1.072}Mn_{1.828}Al_{0.1}O_4 + 0.0274B$ | 4.8 |

| Examples and Comp. Examples | Properties of particles according to the present invention Average primary particle diameter (μm) | Average secondary particle diameter (D50) (μm) | Ratio of average secondary particle diameter to that of precursor (—) |
|---|---|---|---|
| Example 1 | 5 | 6.2 | 1.19 |
| Example 2 | 5 | 6.5 | 1.24 |
| Example 3 | 1.4 | 4.8 | 1.99 |
| Comp. Example 1 | 5 | 7.0 | 1.40 |
| Comp. Example 2 | 5.2 | 9.6 | 2.00 |

| Examples and Comp. Examples | Properties of particles according to the present invention Specific surface area (m²/g) | Packing density (tapped 500 times) (g/cm³) | Compressed density (3 t) (g/cm³) |
|---|---|---|---|
| Example 1 | 0.74 | 1.91 | 2.96 |
| Example 2 | 0.59 | 1.88 | 2.92 |
| Example 3 | 1.08 | 1.40 | 2.66 |
| Comp. Example 1 | 0.58 | 1.78 | 2.81 |
| Comp. Example 2 | 0.43 | 2.00 | 2.79 |

Also, the evaluation results of battery characteristics of the CR2032 type coin cells produced by using the positive electrode active substance particles according to the present invention are shown in Table 3.

TABLE 3

| Examples and Comp. Examples | Composition of positive electrode active substance | Battery characteristics Initial discharge capacity (mAh/g) |
|---|---|---|
| Example 1 | $Li_{1.072}Mn_{1.828}Al_{0.1}O_4 + 0.00092P$ | 105 |
| Example 2 | $Li_{1.072}Mn_{1.828}Al_{0.1}O_4 + 0.00183P$ | 105 |
| Example 3 | $Li_{1.072}Mn_{1.828}Al_{0.1}O_4$ | 103 |
| Comp. Example 1 | $Li_{1.065}Mn_{1.905}Mg_{0.05}O_4$ | 109 |
| Comp. Example 2 | $Li_{1.072}Mn_{1.828}Al_{0.1}O_4 + 0.0274B$ | 108 |

| Examples and Comp. Examples | Battery characteristics Capacity recovery rate (%) | High-temperature cycle capacity retention rate (%) | Rate characteristic (5 C/0.1 C) × 100 (%) |
|---|---|---|---|
| Example 1 | 98 | 97 | 96 |
| Example 2 | 98 | 97 | 96 |
| Example 3 | 99 | 92 | 98 |
| Comp. Example 1 | 92 | 86 | 83 |
| Comp. Example 2 | 93 | 88 | 88 |

INDUSTRIAL APPLICABILITY

The positive electrode active substance particles according to the present invention in which primary particles of the positive electrode active substance are well controlled in a crystal shape thereof, are excellent in packing property as well as load characteristics and a high-temperature stability and, therefore, can be suitably used as a positive electrode active substance for secondary batteries.

The invention claimed is:
1. Positive electrode active substance particles for lithium ion batteries, comprising lithium manganate particles comprising (i) a lithium manganate and also separately (ii) a crystal plane growth inhibitor, wherein the lithium manganate comprises Li and Mn as main components and having a cubic spinel structure with a space group: Fd-3m, the lithium manganate is represented by a formula of $LiMn_2O_4$, and a portion of Mn within the lithium manganate may be substituted with another metal element of one or more anions selected from the group consisting of Li, Fe, Mn, Ni, Mg, Zn, Al, Co, Cr, Si, Ti, Sn, V and Sb, the crystal plane growth inhibitor comprises Al and/or P, primary particles of the positive electrode active substance have a dodecahedral or higher-polyhedral shape in which none of crystal planes equivalent to a plane are located adjacent to each other, and flat crystal planes are crossed with each other to form a clear ridge, and an average primary particle diameter of the primary particles is not less than 1 μm and not more than 20 μm.

2. Positive electrode active substance particles for lithium ion batteries according to claim 1, wherein a ratio of Li to a sum of Mn and a substituting metal element Li/(Mn+substituting metal element) in which the substituting metal element is at least one metal element other than Li and Mn with which an Mn (16d) site is substituted in the positive electrode active substance is not less than 0.5.

3. A process for producing the positive electrode active substance particles as defined in claim 1, comprising the steps of mixing a manganese compound, a lithium compound and a crystal plane growth inhibitor with each other; and calcining the resulting mixture at a temperature of 800 to 1050° C.

4. A process for producing the positive electrode active substance particles according to claim 3, wherein the manganese compound is in the form of secondary particles obtained by aggregating primary particles of $Mn_3O_4$ having a generally octahedral shape which is defined by any of an octahedral shape close to a regular octahedral shape in which flat crystal planes are crossed with each other to form a clear ridge; a near-octahedral shape in which a portion at which four planes of an octahedron are crossed with each other forms not a complete apex but a plane or a ridge; a near-octahedral shape in which a portion at which two planes of an octahedron are crossed with each other forms not a complete ridge but a plane; and a near-octahedral shape which is formed by lacking a portion of these shapes.

5. A process for producing the positive electrode active substance particles according to claim 3, wherein the crystal plane growth inhibitor is a phosphorus compound and/or an aluminum compound.

6. A non-aqueous electrolyte secondary battery comprising the positive electrode active substance particles as defined in claim 1.

7. Positive electrode active substance particles for lithium ion batteries according to claim 1, wherein a content of the phosphorus component in the positive electrode active substance particles is 0.0001 to 0.05 in terms of a molar ratio of P based on Mn.

* * * * *